United States Patent
Ba-abbad et al.

(10) Patent No.: US 8,419,904 B2
(45) Date of Patent: Apr. 16, 2013

(54) SYSTEMS AND METHODS FOR SOLAR WATER PURIFICATION

(75) Inventors: Mazen Ba-abbad, Riyadh (SA); Hany Al-Ansary, Riyadh (SA); Essam Al-Bahkali, Riyadh (SA); Essam Al-Ammar, Riyadh (SA); Ibrahime Al-Olayan, Riyadh (SA); Davinder Surah, Leeds (GB)

(73) Assignee: King Saud University, Riyadh (SA)

( * ) Notice: Subject to any disclaimer, the term of this patent is extended or adjusted under 35 U.S.C. 154(b) by 324 days.

(21) Appl. No.: 12/885,425

(22) Filed: Sep. 17, 2010

(65) Prior Publication Data

US 2011/0284362 A1 Nov. 24, 2011

Related U.S. Application Data

(60) Provisional application No. 61/347,452, filed on May 23, 2010.

(51) Int. Cl.
| | | |
|---|---|---|
| *B01D 3/06* | (2006.01) | |
| *B01D 3/10* | (2006.01) | |
| *C02F 1/14* | (2006.01) | |
| *C02F 1/04* | (2006.01) | |
| *B01D 21/00* | (2006.01) | |

(52) U.S. Cl.
USPC ............... 203/10; 203/47; 203/48; 203/100; 203/DIG. 1; 202/154; 202/167; 202/234; 202/261; 159/903

(58) Field of Classification Search ............ 203/DIG. 1, 203/10, 47, 48, 100; 202/154, 167, 234, 202/261; 159/903
See application file for complete search history.

(56) References Cited

U.S. PATENT DOCUMENTS

| | | | | |
|---|---|---|---|---|
| 4,281,640 A | * | 8/1981 | Wells | 126/692 |
| 4,312,709 A | * | 1/1982 | Stark et al. | 202/83 |
| 4,323,052 A | * | 4/1982 | Stark | 126/571 |
| 4,383,891 A | * | 5/1983 | Clavier | 202/234 |
| 5,191,876 A | * | 3/1993 | Atchley | 126/576 |
| 5,592,932 A | * | 1/1997 | Yeomans | 126/686 |
| 6,696,637 B2 | * | 2/2004 | Lawheed | 136/246 |
| 8,013,236 B2 | * | 9/2011 | Horne et al. | 136/246 |
| 8,246,786 B2 | * | 8/2012 | Cap et al. | 202/82 |

(Continued)

FOREIGN PATENT DOCUMENTS

WO     WO 93/09390     *  5/1993

OTHER PUBLICATIONS

Carolyn Roos, Concentrating Solar Collectors, May 2008, Washington State University Extension Energy Program.*

(Continued)

*Primary Examiner* — Nina Bhat
*Assistant Examiner* — Jonathan Miller
(74) *Attorney, Agent, or Firm* — Hart IP Law & Strategies

(57) ABSTRACT

Systems and methods for solar water purification are described. In one exemplary aspect, the system includes a sun-tracking reflecting mirror unit, and a two-axis Fresnel concentrator mirror unit to collect sunlight reflected from the sun-tracking reflecting mirror unit and focus the sunlight. A central water purification boiler module includes a heating zone upon which the sunlight is focused by the two-axis Fresnel concentrator mirror unit. The focused sunlight heats the water contained therein to create steam which is redirected to heat water coming into the boiler and to condense as purified water.

20 Claims, 13 Drawing Sheets

U.S. PATENT DOCUMENTS

| | | | | |
|---|---|---|---|---|
| 8,246,787 B2* | 8/2012 | Cap et al. | | 202/82 |
| 2003/0150704 A1* | 8/2003 | Posada | | 203/1 |
| 2008/0041441 A1* | 2/2008 | Schwartzman | | 136/246 |
| 2008/0190755 A1* | 8/2008 | McClure | | 203/86 |
| 2009/0152093 A1* | 6/2009 | Millar | | 203/10 |
| 2009/0223508 A1* | 9/2009 | Hinderling | | 126/628 |
| 2011/0174605 A1* | 7/2011 | Ugolin | | 203/10 |

OTHER PUBLICATIONS

David R. Mills, Graham L. Morrison, Compact Linear Fresnel Reflector Solar Thermal Powerplants, Mar. 2000, Solar Energy, vol. 68, No. 3, pp. 263-283.*

* cited by examiner

SYSTEMS AND METHODS FOR SOLAR WATER PURIFICATION

CROSS-REFERENCE TO RELATED APPLICATION

This application claims priority to U.S. Provisional Patent Application Ser. No. 61/347,452, titled "Solar Water Purification System," filed 23 May 2010, which is hereby incorporated by reference.

BACKGROUND

Conventional water desalination and/or purification systems require considerable amounts of energy and/or equipment. Additionally, existing solar systems to purify water (e.g. solar stills) are generally cost prohibitive and typically inefficient. Such conventional systems may also produce concentrated brine discharges that can harm the environment.

SUMMARY

Systems and methods for solar water purification are described. In one exemplary aspect, the system includes a sun-tracking reflecting mirror unit, and a two-axis Fresnel concentrator mirror unit to collect sunlight reflected from the sun-tracking reflecting mirror unit and focus the sunlight. A central water purification boiler module includes a heating zone upon which the sunlight is focused by the two-axis Fresnel concentrator mirror unit. The focused sunlight heats the water contained therein to create steam which is redirected to heat water coming into the boiler and to condense as purified water.

This Summary is provided to introduce a selection of concepts in a simplified form that are further described below in the following Detailed Description section. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

The systems and methods described herein relate to solar water purification. The present systems and methods may be wall-mounted, are relatively easy to maintain, assemble and disassemble, and have considerably zero discharge with substantially no brine water blow-down. This gives the present systems and methods the ability to purify sea, sewage water, drainage water, manufacturing process wastewater, etc., without any or substantially any liquid discharge that may be harmful to the environment. In one implementation, for example, the system is wall-mounted and uses a curtain-style hanging sun-tracking reflector mirror arrangement to direct sunlight onto a two-axis Fresnel mirror that works as a collector to concentrate solar radiation by point focusing the solar radiation. Other implementations may employ additional similar fixed two-axis Fresnel type mirrors that work as paired collectors to point focus solar radiation, with corresponding reflecting mirrors. Paired mirrors, for example, may be track mounted or cascaded. In accordance with various embodiments, use of low cost anti-scalant, such as acetic acid, allows dissolved and suspended water contaminates to be extracted as solids. Exemplary system embodiments may also re-circulate latent steam heat to increase heat use efficiency. Other than basic filtration, the present exemplary systems and methods are independent of pre-treatment of water. The salts and other dissolved solids can be reclaimed for beneficial use.

The particular examples discussed herein use solar energy and may refer to desalination of salt water. However, the present systems and methods for water purification may use any source of thermal energy and may be used to purify any number of water sources such as sewage water, drainage water, manufacturing process wastewater, and/or so on.

Example Wall-Mounted Solar Water Purification System

Figure 1:
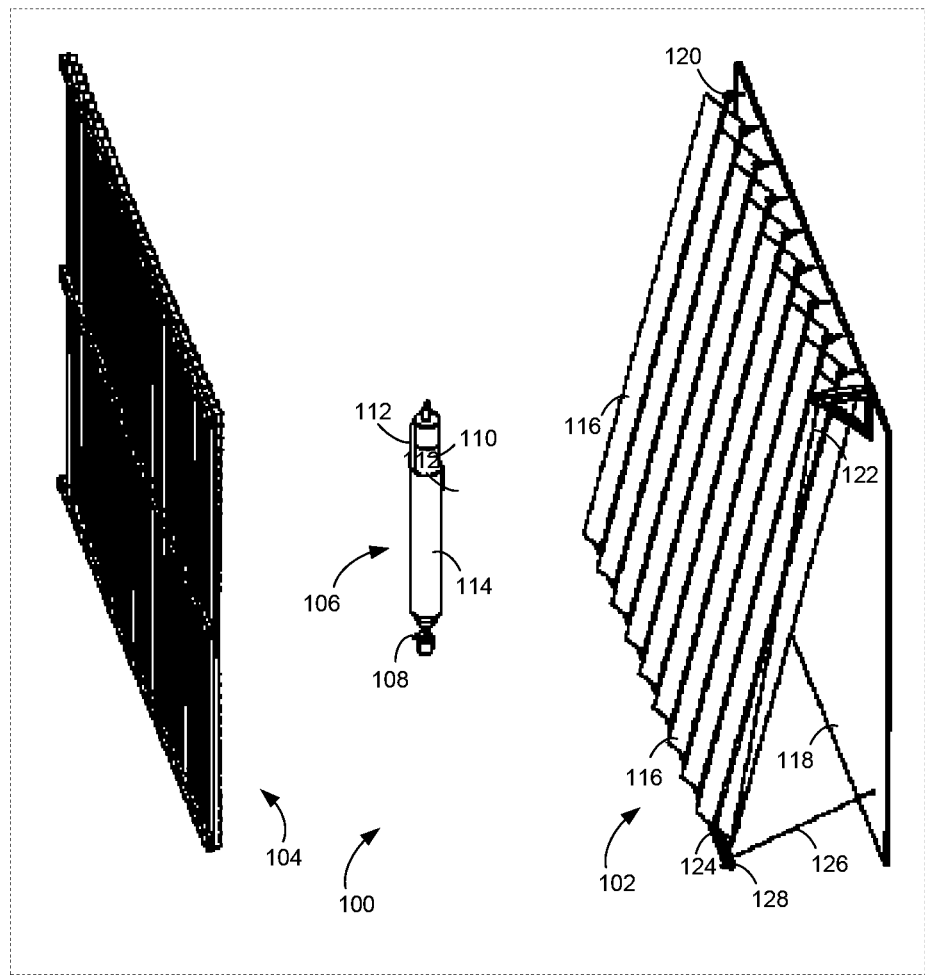
FIG. 1 shows an example of a wall-mounted solar water purification system, according to one embodiment.

FIG. 1 shows example wall-mounted solar water purification system 100, according to one embodiment. Solar water purification system 100 comprises sun-tracking reflector mirror unit 102 and two-axis Fresnel concentrator mirror unit 104, which collects sunlight reflected from sun-tracking reflector mirror unit 102 and focuses the sunlight on central coaxial water purification boiler module 106. Raw, contaminated water enters illustrated coaxial water purification boiler module 106 from the bottom at raw water inlet 108, where it is mixed with an anti-scalant such as acetic acid in an inner column of the coaxial water purification boiler module tube. The mixture is pumped such that its level reaches heating zone 110. Solar rays are reflected from wall-mounted curtain-like solar sun-tracking reflector mirror unit 102 to multiple (e.g., two) axis Fresnel concentrator mirror unit 104 which focuses the solar radiation along two axes to point focus the solar radiation on heating zone 110 of water purification boiler module 106. The resulting high temperature at heating zone 110 boils the acid-raw water mixture. In accordance with various implementations, the heated surface temperature at heating zone 110 may be around 700° C. However, the type and concentration of the anti-scalant present raises the boiling temperature of the water mixture to about 118-200° C., which is the inner surface temperature at heating zone 110 in such implementations. Since the water has lower boiling temperature than the anti-scalant (e.g., acetic acid boils at 118° C.), the water leaves the boiling mixture as steam that exits heating zone 110 at the top and is redirected, via steam collection tube 112 to steam condenser jacket 114 at the bottom by the water purification boiler module.

In accordance with various implementations, sun-tracking reflector mirror unit 102 includes sun tracking mirror slides 116 that are pivotally mounted to a wall (118) or similar (existing) structure using swivel joints 120. Mirror slides 116 may be connected by cable 122, and their bases may be connected by rack 124. Rack 124, and hence the bases of mirror slides 116 may be stood-off from wall 118 by brace 126. Two-axis sun tracking motor 128 adjusts the angle mirror slides 116 at the same time by movement along brace 126 and movement of cable 122. In this implementation, flat mirrors slides 116 are connected together and are moved by a single motor.

Figure 2:
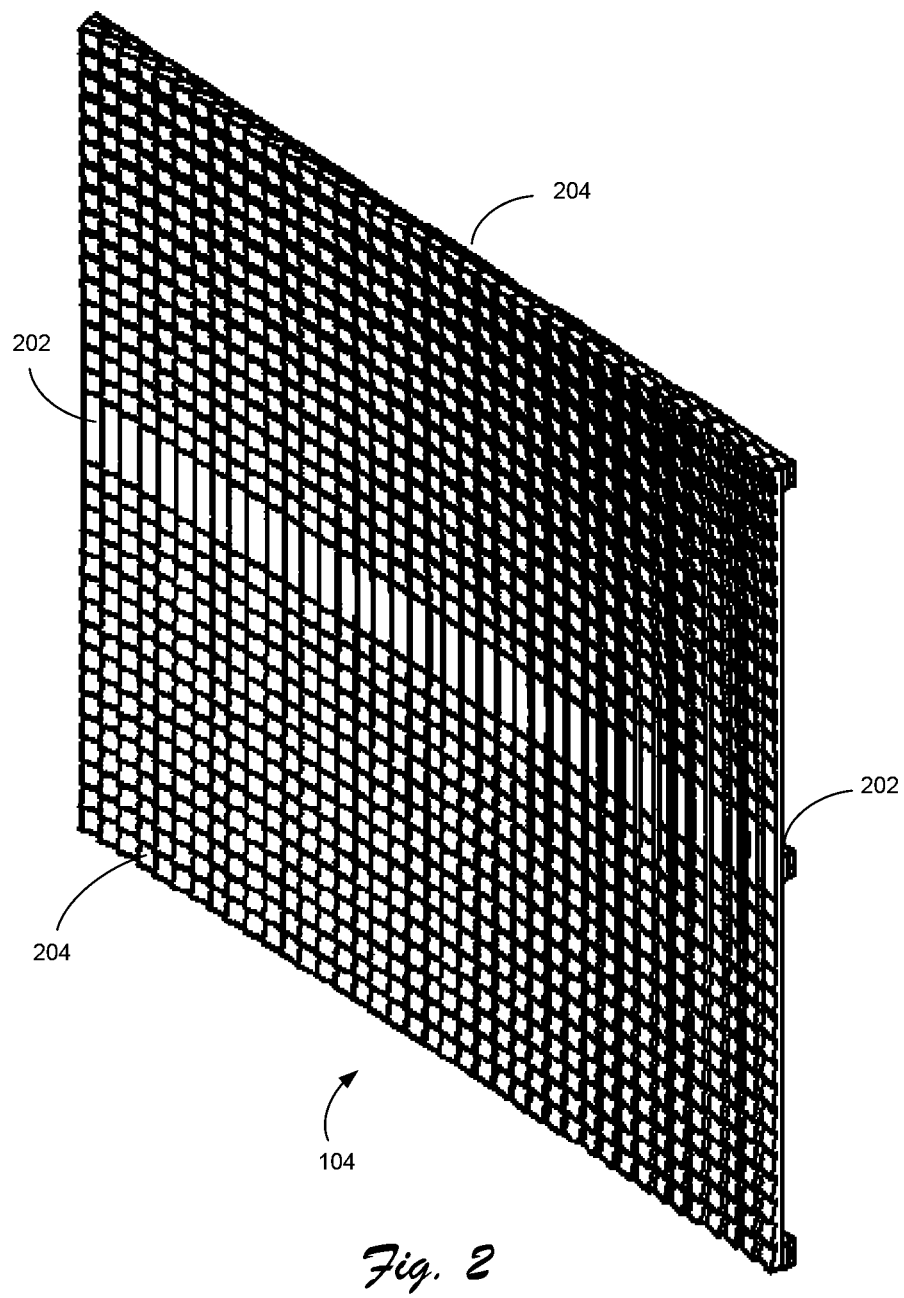
FIG. 2 shows an example two-axis Fresnel concentrator mirror unit adapted for use in the present solar water purification system, according to one embodiment.

FIG. 2 shows an example two-axis Fresnel concentrator mirror unit 104 adapted for use in the present solar water purification system, according to one embodiment. In accordance with various implementations, two-axis Fresnel solar concentrator mirror 104 is affixed to a wall, or similar structure (not shown for clarity). Two-axis Fresnel concentrator mirror unit 104 is comprised of a number of flat, rectangular (202) and generally square mirrors (204) oriented to provide two axes of focus with respect to the overall face of two-axis Fresnel concentrator mirror unit 104 to provide the aforementioned point focus, along two axes at the heating zone of the water purification boiler module. In accordance with particular implementations, low cost flat rectangular mirrors that are of the same size are arranged in two directions to give point focus for two-axis Fresnel concentrator mirror unit 104. Each mirror is tilted in two directions, relative to the flat frame of the unit, such that the incident normal rays are reflected in one place. At the same time these flat rectangular mirrors have flat edge that can be easily mounted on a flat frame. This arrangement reduces the cost of the system. Despite being relatively flat, the present two-axis Fresnel solar concentrator mirror unit reflects and focuses light in the manner of a paraboloid dish. That is, the present two-axis Fresnel solar concentrator mirror unit focuses the normal parallel incident light into a single point at the focus of the unit, i.e. at the focus of the paraboloid.

Figure 3:
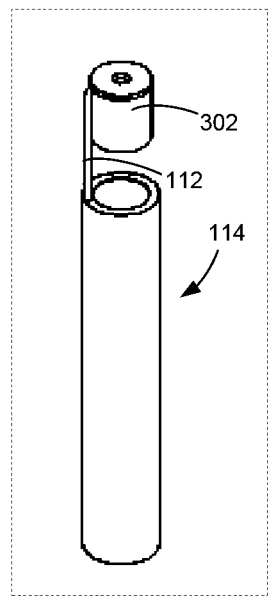
FIG. 3 shows an example of a steam-condensing jacket for use with the water purification boiler module of FIG. 1, according to one embodiment.

FIG. 3 shows an example of steam-condensing jacket 114 for use with coaxial water purification boiler module 106 of FIG. 1, according to one embodiment. Steam collection cap 302 collects steam, which is redirected to steam-condensing jacket 114 via steam collection tube 112. Steam-condensing jacket 114 is insulated from the outside but exchanges heat with the inner column of coaxial water purification boiler module 102, which contains the water and acid mixture. Thus, the redirected steam pre-heats the mixture and condenses when cooled by the incoming relatively cold raw water and acid mixture. The distilled condensed water is collected from the open bottom of steam-condensing jacket 114.

Figure 4:
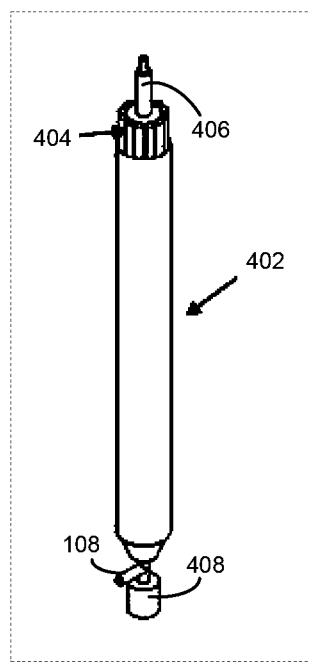
FIG. 4 shows an example inner column of the water purification boiler module of FIG. 1, according to one embodiment.
Figure 5:
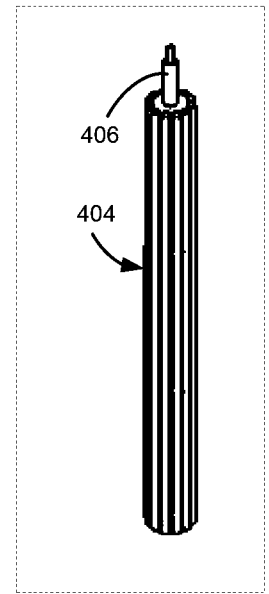
FIG. 5 shows an example of a cleaning shaft adapted for use in the water purification boiler module shown in FIGS. 1, 3 and 4, according to one embodiment.

FIG. 4 shows example inner column 402 of water purification boiler module 106 of FIG. 1, according to one embodiment. Inner column 402 contains the water and anti-scalant mixture. The solids that are dissolved in the raw water are continuously scrubbed from the inside of inner column 402 by cleaning rods 404 operatively coupled, mounted, or otherwise fixed to/on rotating shaft 406, which is driven by a motor (not shown) mounted atop water purification boiler module 106. The solids settle at solids collection container 408 at the bottom of the water purification boiler module. FIG. 5 shows an example of cleaning shaft 406 with cleaning rods 404 adapted for use in the water purification boiler module of FIGS. 1, 3 and 4, according to one embodiment.

Another Example Solar Water Purification System

Figure 6:
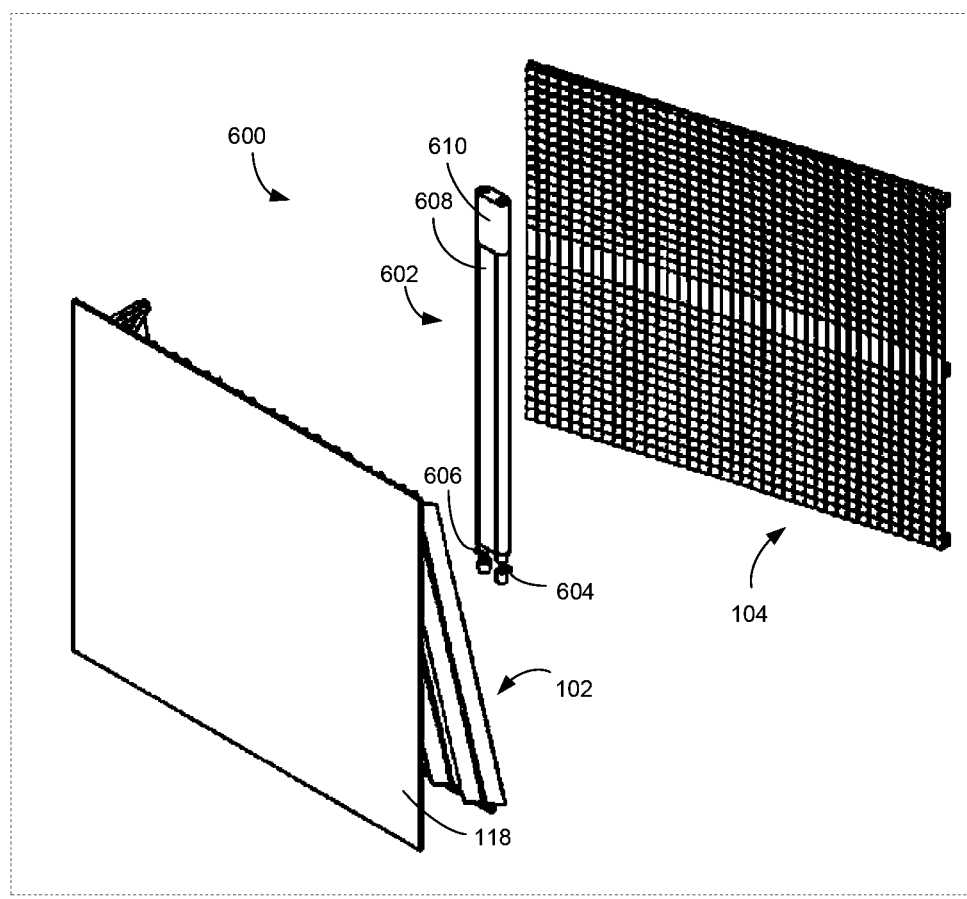
FIG. 6 shows another example of a wall-mounted solar water purification system employing an alternative embodiment water purification boiler module, according to one embodiment.

FIG. 6 shows an alternative example wall-mounted solar water purification system 600 which employs alternative embodiment water purification boiler module 602, according to one embodiment. In this example system, raw contaminated water enters water purification boiler module 602 from the bottom at raw water inlets 604 and 606 where it is mixed with an anti-scalant such as acetic acid. The mixing occurs in columns that are located at the sides of water purification boiler module 602. The mixture is pumped such that its level reaches heating zone 608. Solar rays are reflected from wall-mounted sun-tracking reflector mirror unit 102 to two-axis Fresnel concentrator mirror unit 104 which provides heat at heating zone 608. The resultant high temperature at heating zone 608 makes the acid-raw water mixture boil. Since the water has lower boiling temperature than the anti-scalant, the water leaves the boiling mixture as steam and exits heating zone 608 via steam collection box 610 at the top of water purification boiler module 602. The steam is redirected by steam collection box 610 to a steam condenser column in the middle of water purification boiler module 602, between the raw water and anti-scalant mixture columns.

Figure 7:
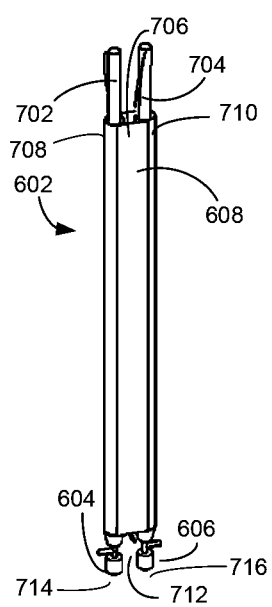
FIG. 7 shows the water purification boiler module of FIG. 6, with the steam collection box removed to show the screw-type cleaning shafts, according to one embodiment.

FIG. 7 shows water purification boiler module 602 of FIG. 6, according to one embodiment, with steam collection box 610 removed to show screw-type cleaning shafts 702 and 704. Also shown in FIG. 7 is steam-condensing column 706, which exchanges heat with outer tubes 708 and 710 that contain the water and acid mixture, thereby pre-heating the mixture and condensing the steam when cooled by the incoming relatively cold raw water. The resulting distilled condensed water is collected from distilled water outlet 712 at the bottom of steam-condensing column 706. In this implementation, the solids that are dissolved in the raw water are continuously scrubbed from outer columns 708 and 710 by rotating screw-type cleaning shafts 702 and 704, which are driven by one or more motors (not shown for purposes of clarity) mounted atop water purification boiler module 602. Solids settle at solids collection containers 714 and 716 at the bottom of water purification boiler module 602.

Figure 8:
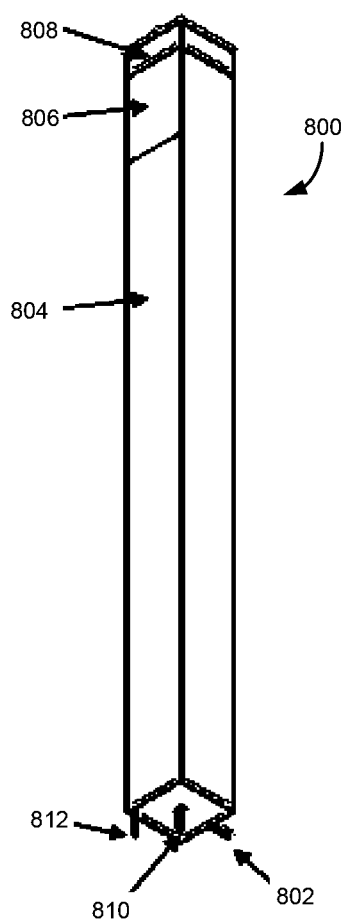
FIG. 8 shows a third example water purification boiler module adapted for use with the present solar water purification system, according to one embodiment.

An Exemplary Solar Water Purification System with a Square Column Water Purification Boiler Module FIG. 8 shows third example water purification boiler module 800 adapted for use with the present solar water purification system. In this exemplary system, raw water enters water purification boiler module 800 from the bottom, via inlet port 802. The raw water mixes with an anti-scalant such as acetic acid and is kept between outer casing 804 and an inner steam-condensing tube. The raw water is pumped such that its pressure will allow the mixture of raw water and anti-scalant to rise to heating zone 806. Concentrated solar energy such as provided by solar sun-tracking reflector mirror unit 102 and two-axis Fresnel concentrator mirror unit 104, as discussed above, heats heating zone 806 to about 118°-200° C. The mixture boils and the resulting steam rises to upper cap 808 where it flows down inside the steam-condensing inner column. The steam condenses at the bottom of water purification boiler module 800 and exits as distilled water, via distilled water outlet 810. Due to the presence of the anti-scalant, salt in the raw water precipitates down the unit between the outer casing and the steam-condensing tube, as loose solid where it is discharged from salt exit port 812.

Figure 9:
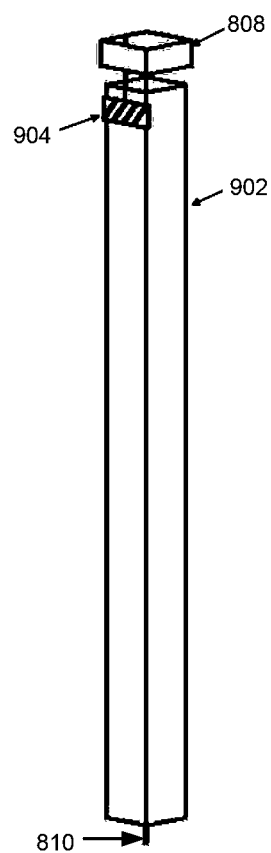
FIG. 9 shows a steam-condensing inner column and cleaning rack of the water purification boiler module of FIG. 8, according to one embodiment.

FIG. 9 shows steam-condensing inner column 902 and cleaning rack 904 of water purification boiler module 800 of FIG. 8, according to one embodiment. As noted, as the water and anti-scalant mixture boils, the resulting steam rises to upper cap 808 where it flows down inside steam-condensing inner column 902. The steam exchanges its latent heat with the raw water mixture present in the space between inner column 902 and outer casing 804. Resultantly, the steam condenses at the bottom of steam-condensing inner column 902 and exits as distilled water, via distilled water outlet 810. Cleaning rack 904 periodically scrapes heating zone 806, between the outer casing's inner surface and the steam-condensing inner column's outer surface, to remove any attached solids and allow them to precipitate down and exit water purification boiler module 800 via exit port 812 (FIG. 8). A venting hole (not shown) in upper cap 808 allows any non-condensable gases to vent.

An Exemplary Track-Mounted System for Solar Water Purification

Figure 10:
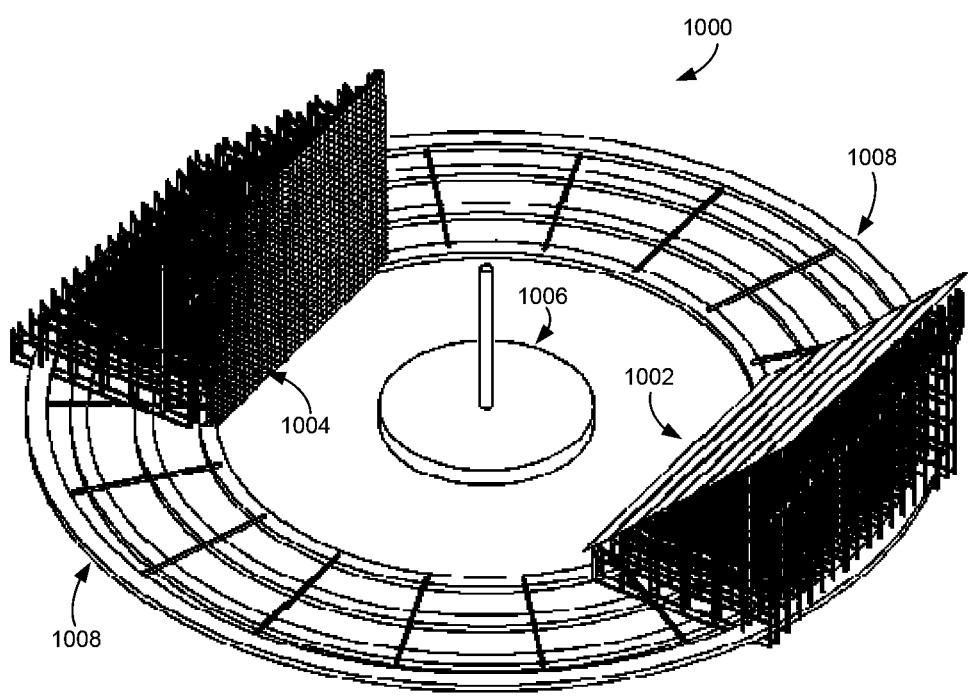
FIG. 10 shows an example of a track mounted solar water purification system, according to one embodiment.

FIG. 10 shows example track mounted solar water purification system 1000, according to one embodiment. In this exemplary system, solar rays are reflected by sun tracking reflecting mirror unit 1002 to two-axis Fresnel concentrator mirror unit 1004. Two-axis Fresnel concentrator mirror unit 1004 reflects focused solar rays at water purification boiler module 1006. Both mirror units 1002 and 1004 rotate on tracks 1008 to follow the sun's movement.

Figure 11:
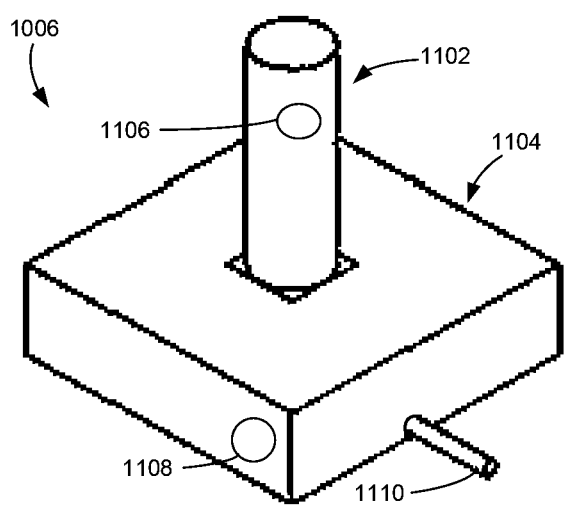
FIG. 11 shows an example water purification boiler module adapted for use with the track mounted water purification system of FIG. 10, according to one embodiment.

FIG. 11 shows example water purification boiler module 1006 adapted for use with track mounted water purification system 1000 of FIG. 10, according to one embodiment. Referring to FIG. 11, water purification boiler module 1006 includes hollow tower 1102 and hollow base 1104. Concentrated solar rays heat heated zone 1106 at upper part of tower 1102. Raw water enters water purification boiler module 1006 via opening 1108 at one side of hollow base 1104. Distilled water exits water purification boiler module 1006 from pipe 1110 at one side of base 1104. Salt exits the water purification boiler module from the bottom.

Figure 12:
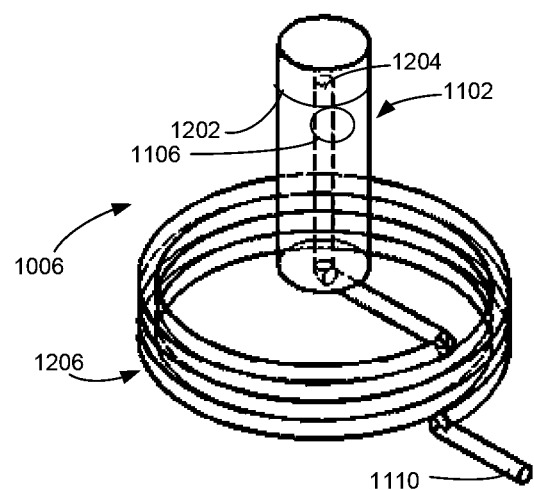
FIG. 12 is a partially fragmented view of water purification boiler module of FIG. 11 with the casing removed, according to one embodiment.

FIG. 12 is a partially fragmented view of water purification boiler module 1006 of FIGS. 10 and 11 with the hollow base casing removed, according to one embodiment. Raw water and anti-scalant mixture pumped into hollow base 1104 via opening 1108 raises to upper liquid level 1202. Heated zone 1106 of tower 1102 is just below upper liquid level 1202. The mixture is heated by the concentrated solar rays and water is boiled off of the mixture. Steam is collected from the top of the unit by steam collection pipe 1204. Steam collection pipe 1204 carries the steam downward to steam condensation coil 1206, which is immersed in the liquid mixture inside hollow base 1104. The steam in coil 1206 is cooled by the raw water and anti-scalant mixture and in turn, the steam in coil 1206 preheats the raw water and anti-scalant mixture. Salt is deposited from the bottom of the unit as it is allowed to precipitate.

An Exemplary Cascaded System for Solar Water Purification

Figure 13:
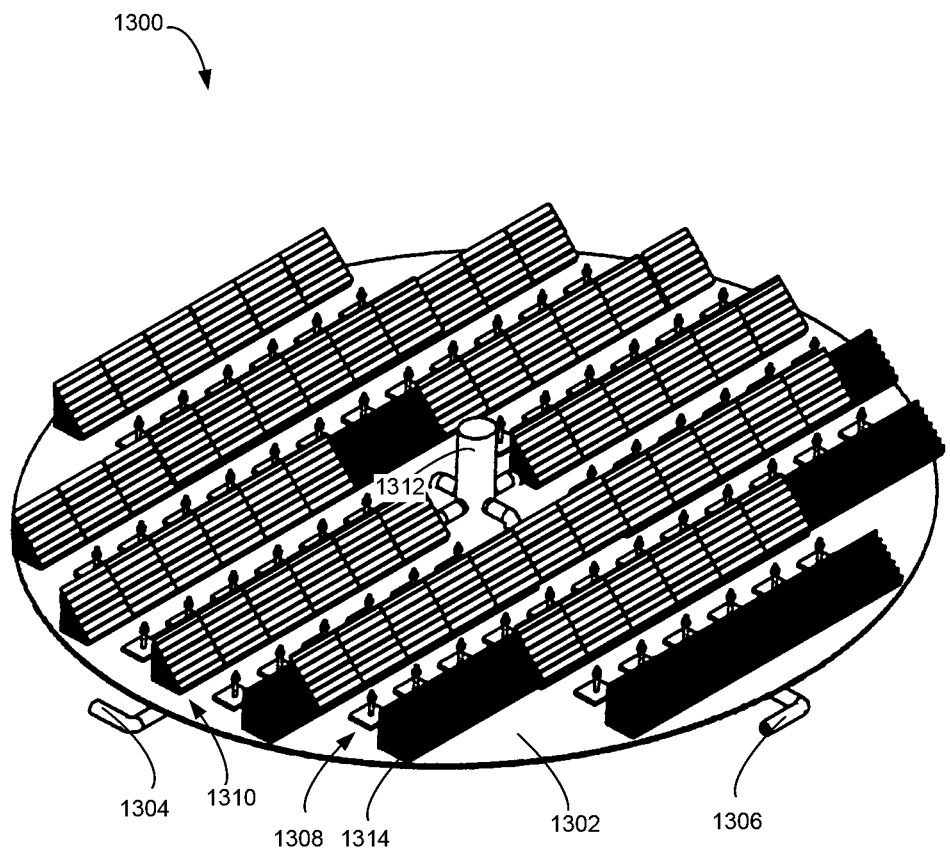
FIG. 13 is a perspective view of a cascaded solar water purification system, according to one embodiment.

FIG. 13 is a perspective view of cascaded solar water purification system 1300, according to one embodiment. Example cascaded solar water purification system 1300 is shown on circular platform 1302, which may float in a (circular) lake of raw water. The raw water is sucked into system 1300 by suction pipes 1304, 1306, etc. The water suction will rotate system 1300 around the center of disc 1302 to track the sun. Floats may be installed or otherwise incorporated into platform 1302 to provide floatation and rotational stability. Water purification boiler modules 1308 are located between rows of sun-tracking reflector mirror units 1310 and rows of two-axis Fresnel concentrator mirror units (obscured in FIG. 13). Raw water may be sucked into central raw water storage tank 1312 to provide raw water with enough pressure to enter each water desalination module 1308. The mirror units are sandwiched on support structures 1314. One face of each support structure mounts a sun-tracking reflector mirror unit 1310 and the other side mounts a two-axis Fresnel concentrator mirror unit.

Figure 14:
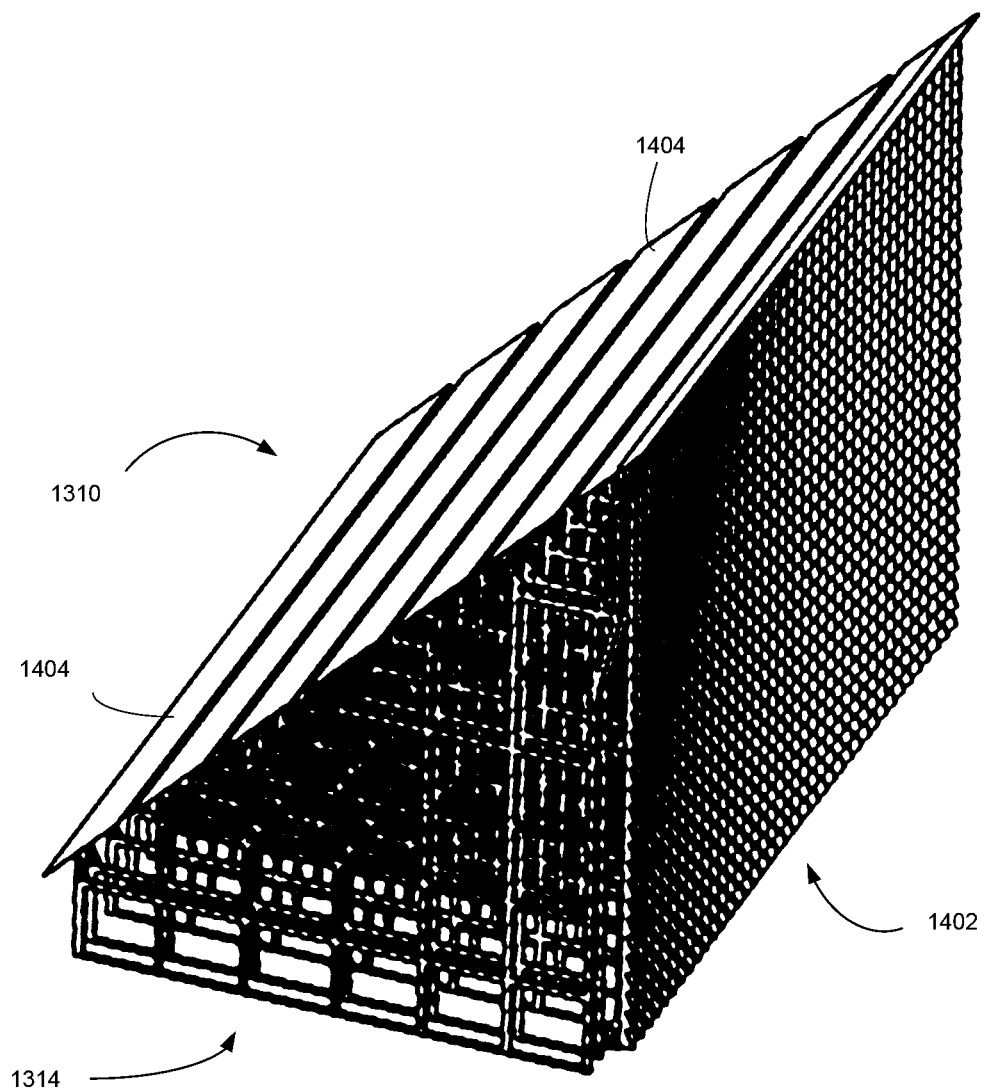
FIG. 14 is a perspective view of a support structure mounting a sun-tracking reflector mirror unit on one side and mounting a two-axis Fresnel concentrator mirror unit on the other side for cascaded arrangement, such as shown in FIG. 13, according to one embodiment.

FIG. 14 is a perspective view of support structure 1314 mounting sun-tracking reflector mirror unit 1310 on one side and mounting two-axis Fresnel concentrator mirror unit 1402 on the other side for cascaded arrangement, such as shown in FIG. 13, according to one embodiment. Sun-tracking reflector mirror unit slides 1404 are shown disposed at a 45° angle. Solar rays inclined at 90° (i.e. directly overhead) are reflected horizontally by mirror slides 1402. In accordance with various embodiments, mirror slides are rotated between a maximum 45°, for 90° solar elevation, and a minimum of 10°, for 20° solar elevation. Mirror slides 1404 are connected by a cable (not visible) that allows them to be moved at the same time by motor (not shown) behind the upper mirror slide. The weight of the mirror slides allows them to rotate downward (as shown in FIG. 14), while the motor rotates them upward. As noted, two-axis Fresnel concentrator mirror unit 1402 is mounted on the back of support structure 1314, in a generally vertical position for use in a cascaded arrangement, such as shown in FIG. 13.

An Exemplary Procedure for Solar Water Purification

Figure 15:
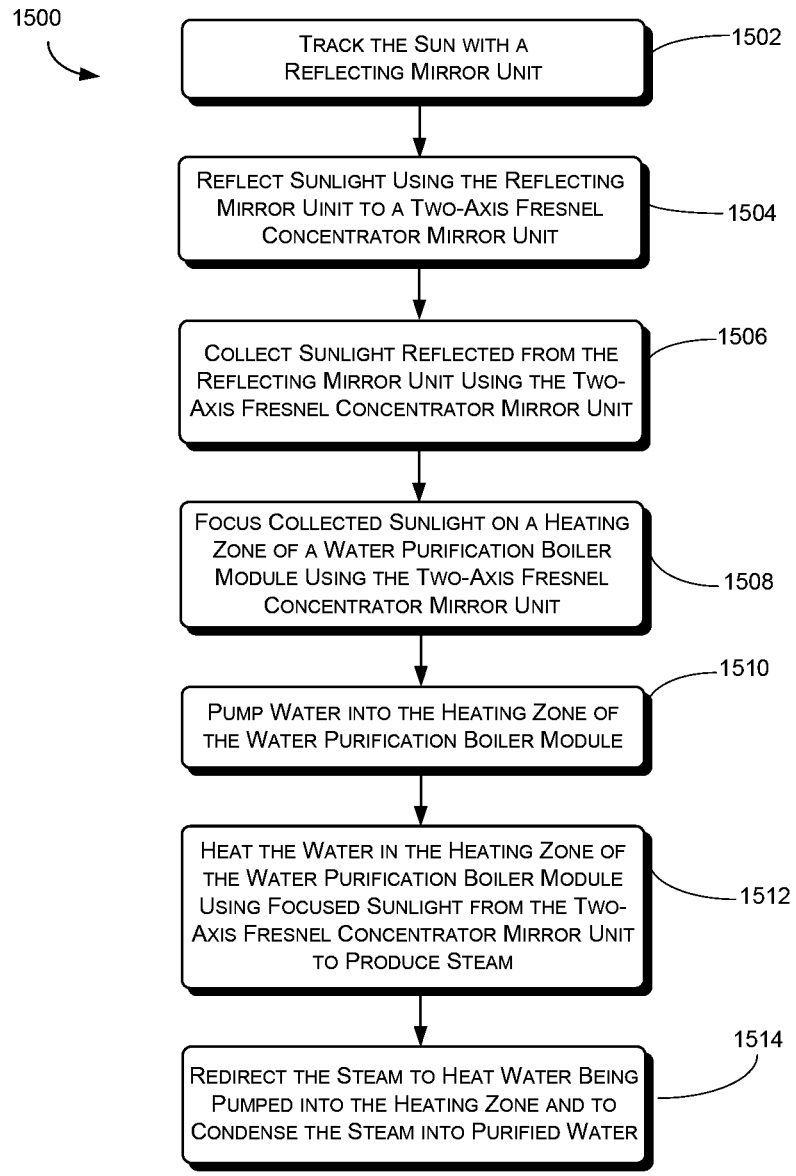
FIG. 15 shows an example procedure for solar water purification, according to one embodiment.

FIG. 15 shows example procedure 1500 for solar water purification, according to one embodiment. In this example, the sun is tracked with a reflecting mirror unit at 1502. At block 1504, sunlight is reflected, using the reflecting mirror unit, to a two-axis Fresnel concentrator mirror unit. The reflected sunlight from the reflecting mirror unit is collected at block 1506 by the two-axis Fresnel concentrator mirror unit. The collected sunlight is focused on a heating zone of a water purification boiler module using the two-axis Fresnel concentrator mirror unit at 1508. Particularly, in certain implementations, the two-axis Fresnel concentrator mirror unit reflects incident radiation along two intersecting axes, generally intersecting at the heating zone of the water purification boiler module. At block 1510, water is pumped into the heating zone of the water purification boiler module. The water in the heating zone of the water purification boiler module is heated at block 1512 using focused sunlight from the two-axis Fresnel concentrator mirror unit to produce steam. Then, at block 1514, the steam is redirected to heat water being pumped into the heating zone and to condense the steam into purified water.

CONCLUSION

Although systems and methods for solar water purification have been described in language specific to structural features and/or methodological operations or actions, it is understood that the implementations defined in the appended claims are not necessarily limited to the specific features or actions described. Rather, the specific features and operations of solar water purification are disclosed as exemplary forms of implementing the claimed subject matter.

The invention claimed is:

1. A solar water purification method comprising:
tracking the sun with a reflecting mirror unit;
reflecting sunlight using the reflecting mirror unit to a two-axis Fresnel concentrator mirror unit;
collecting sunlight reflected from the reflecting mirror unit using the two-axis Fresnel concentrator mirror unit;
focusing collected sunlight on a heating zone of a water purification boiler module using the two-axis Fresnel concentrator mirror unit;
pumping water into the heating zone of the water purification boiler module;
heating the water in the heating zone of the water purification boiler module using focused sunlight from the two-axis Fresnel concentrator mirror unit to produce steam; and
redirecting the steam to heat water being pumped into the heating zone and to condense the steam into purified water.

2. The method of claim 1, wherein the two-axis Fresnel concentrator mirror unit reflects incident radiation along two intersecting axes, intersecting at the heating zone of the water purification boiler module.

3. The method of claim 1, further comprising:
mounting the sun-tracking reflecting mirror unit on a sun-facing surface;
mounting the two-axis Fresnel concentrator mirror unit on a surface opposite the sun-facing surface; and
fixing the water purification boiler module therebetween.

4. The method of claim 1, further comprising:
mounting the sun-tracking reflecting mirror unit and the two-axis Fresnel concentrator mirror unit on a circular track opposite one another; and
fixing the water purification boiler module therebetween.

5. The method of claim 1, further comprising mounting the two-axis Fresnel concentrator mirror unit on a back of a support structure for another sun-tracking reflecting mirror unit.

6. A solar water purification system comprising:
a sun-tracking reflecting mirror unit;
a two-axis Fresnel concentrator mirror unit collecting sunlight reflected from the sun-tracking reflecting mirror unit and focusing the sunlight; and
a central water purification boiler module comprising a heating zone, upon which the sunlight is focused by the two-axis Fresnel concentrator mirror unit, heating water contained therein to create steam which is redirected to heat water coming into the boiler and to condense the steam into purified water.

7. The system of claim 6, wherein the sun-tracking reflecting mirror unit is mounted on a sun-facing surface and the two-axis Fresnel concentrator mirror unit is mounted on a surface opposite the sun-facing surface, with the central water purification boiler module fixed therebetween.

8. The system of claim 6, wherein the sun-tracking reflecting mirror unit and the two-axis Fresnel concentrator mirror unit are mounted on a circular track opposite one another, with the central water purification boiler module fixed therebetween.

9. The system of claim 6, wherein the two-axis Fresnel concentrator mirror unit is mounted on a back of a support structure for another sun-tracking reflecting mirror unit.

10. The system of claim 6, wherein the two-axis Fresnel concentrator mirror unit comprises a plurality of flat mirrors oriented to reflect incident radiation along two intersecting axes, intersecting at the heating zone of the central water purification boiler module.

11. The system of claim 6, wherein the sun-tracking reflecting mirror comprising a plurality of parallel disposed, rectangular mirror slides, each mirror slide pivotally mounted along an axis of the mirror slide, the plurality of slides connected together to pivot together.

12. The system of claim 6, wherein the central water purification boiler module is coaxial, comprising an inner column holding water to be purified and an outer jacket to which the steam is redirected to heat water in the inner column and to condense the steam into purified water.

13. The system of claim 6, wherein the central water purification boiler module comprises spaced apart outer columns holding water to be purified and a central steam condenser column between the outer columns, the steam being redirected into the steam condenser column to heat water in the outer columns and to condense the steam into purified water.

14. The system of claim 6, wherein the central water purification boiler module comprises an outer casing and an inner steam condensing tube, water to be purified disposed in a space between the outer casing and the inner steam condensing tube, the steam being redirected into the steam condenser tube to heat water disposed in the in the space between the outer casing and the inner steam condensing tube and to condense the steam into purified water.

15. The system of claim 6, wherein the central water purification boiler module comprises a hollow base and a hollow tower in fluid flow communication with the hollow base, the tower extending upwardly from the base and defining the heating zone in an upper portion of the tower, the base and tower receiving water to be purified up into the heating zone, the central water purification boiler module further comprising a steam collection pipe collecting steam from a top of the tower and redirecting the steam downward into a steam condensation coil, the coil immersed in water to be purified heating the water to be purified and condensing the steam in the coil into purified water.

16. A cascaded solar water purification system comprising:
a plurality of sun-tracking reflecting mirror units;
a plurality of two-axis Fresnel concentrator mirror units, each two-axis Fresnel concentrator mirror unit mounted vertical to a side of a suntracking mirror unit support structure opposite a supported sun-tracking mirror unit, each two-axis Fresnel concentrator mirror unit collecting sunlight reflected from another sun-tracking reflecting mirror unit and focusing the sunlight; and
a plurality of water purification boiler modules, each comprising a heating zone upon which the sunlight is focused by an associated two-axis Fresnel concentrator mirror unit, heating water contained therein to create steam which is redirected to heat water coming into the water purification boiler module and to condense the steam into purified water.

17. The system of claim 16, wherein each of the two-axis Fresnel concentrator mirror units comprises a plurality of flat mirrors oriented to reflect incident radiation along two intersecting axes, intersecting at the heating zone of an associated water purification boiler module.

18. The system of claim 16, wherein each of the sun-tracking reflecting mirror units comprise a plurality of parallel disposed, rectangular mirror slides, each mirror slide pivotally mounted along an axis of the mirror slide, the plurality of slides connected together to pivot together.

19. The system of claim 16, wherein the cascaded solar water purification system is mounted on a floating platform floating in a lake of water to be purified.

20. The system of claim 16, further comprising at least one suction pipe providing water to be purified to the plurality of water purification boiler modules, suction of the water to be purified by the suction pipe, tangential to the platform, rotating the platform to track the sun.

* * * * *